Aug. 29, 1939.  E. CHRISTIANSEN  2,170,988
MACHINE FOR FEEDING OR DEPOSITING MEASURED QUANTITIES OF DOUGH OR THE LIKE
Filed July 20, 1938  4 Sheets-Sheet 2
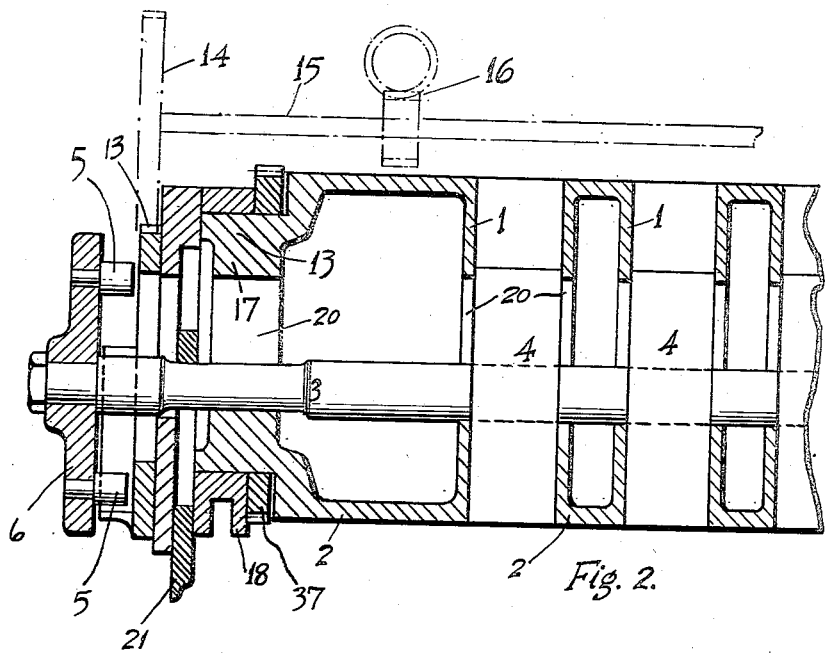
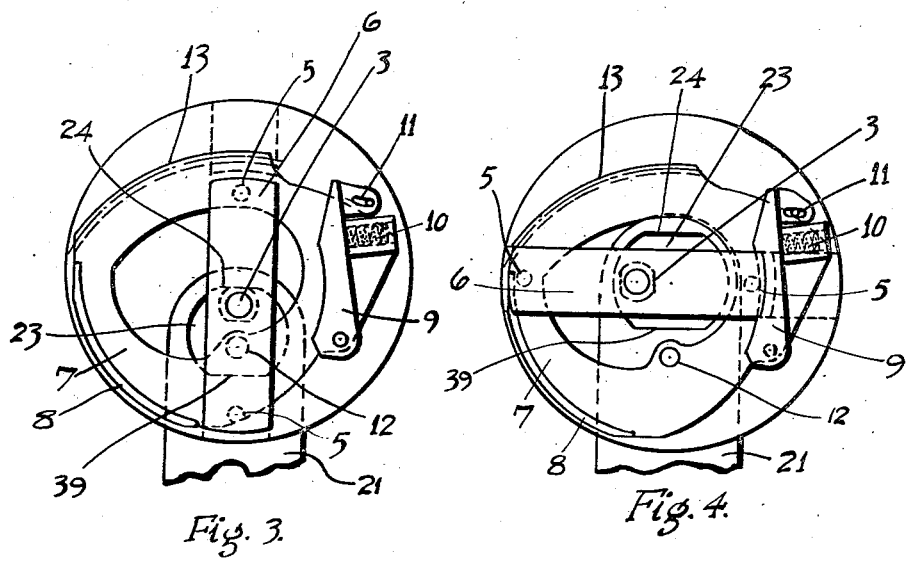
Ejnar Christiansen
Inventor
By C A Snow & Co.
Attorneys.

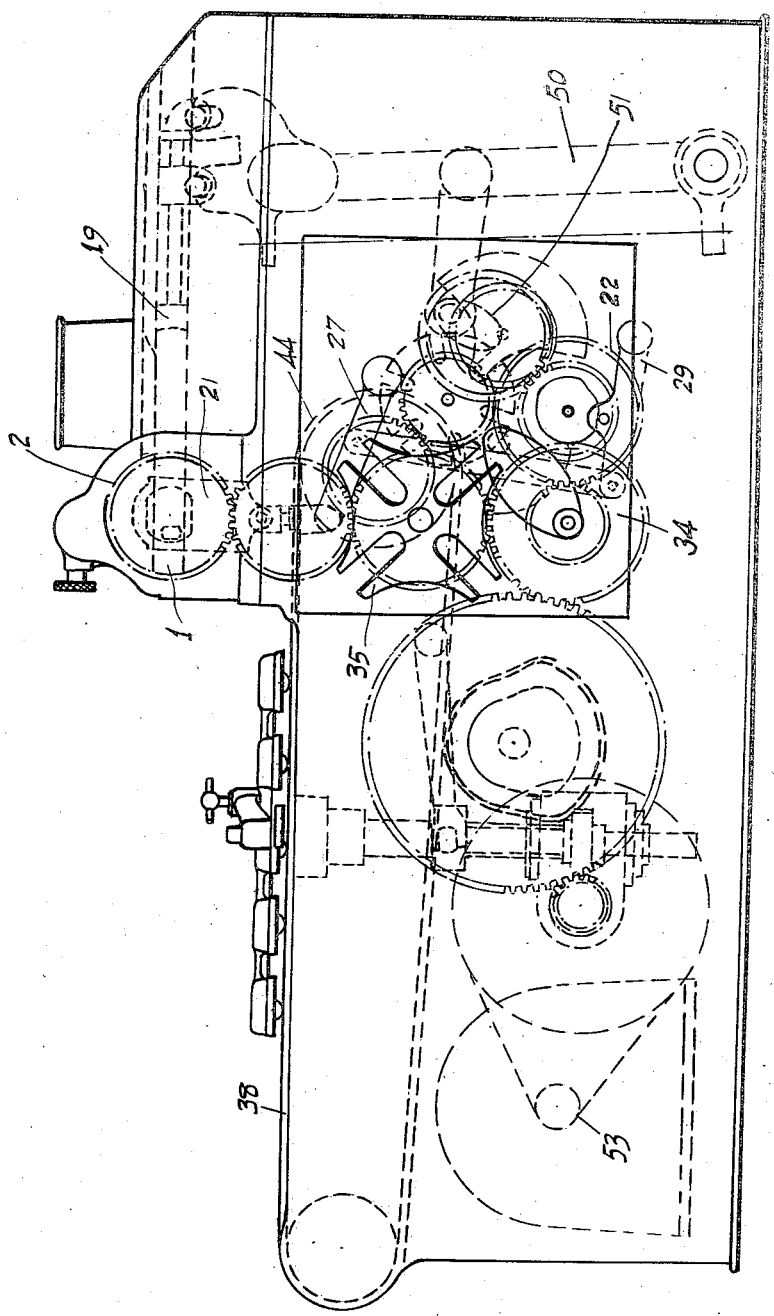

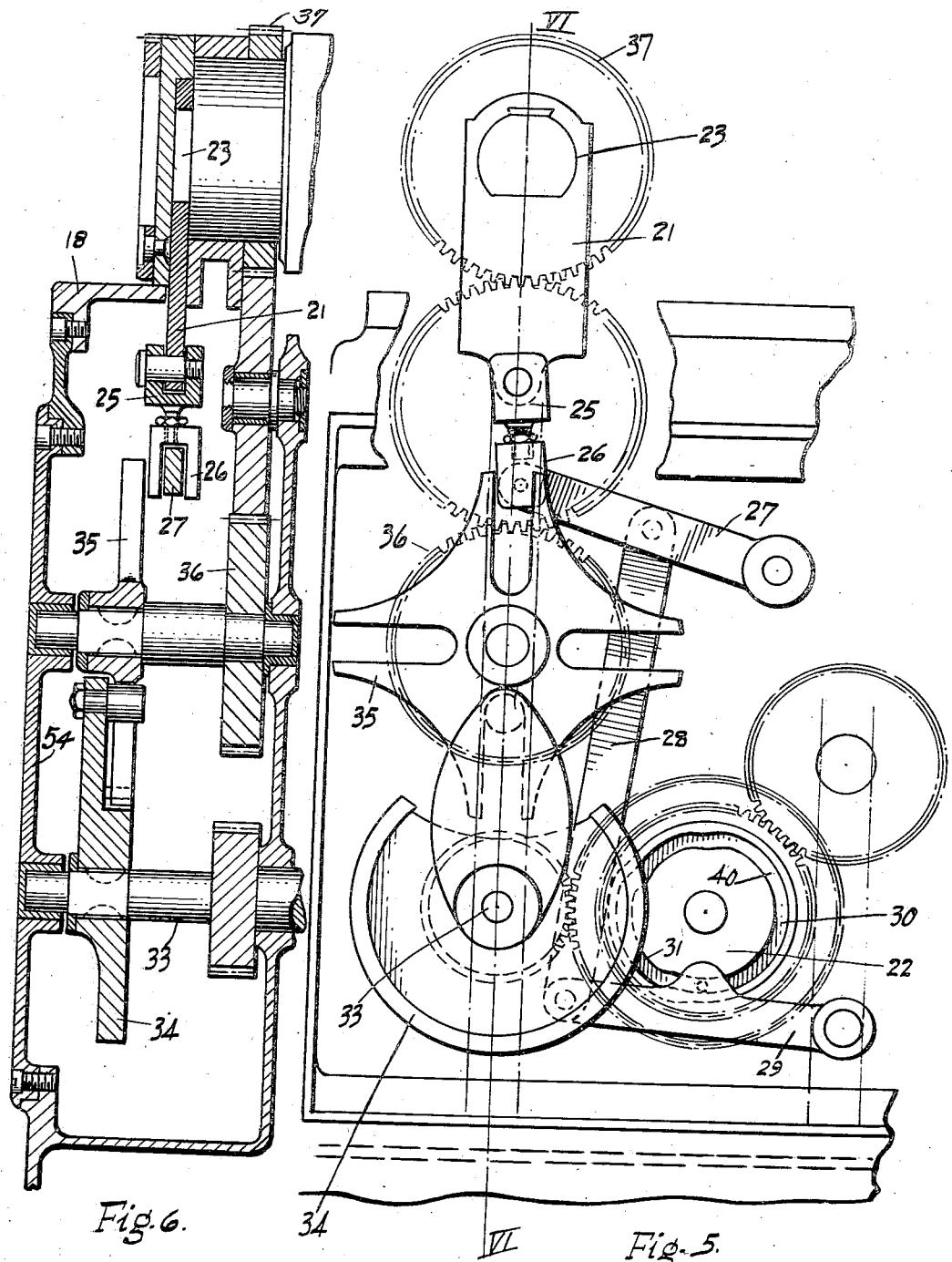

Aug. 29, 1939.  E. CHRISTIANSEN  2,170,988
MACHINE FOR FEEDING OR DEPOSITING MEASURED QUANTITIES OF DOUGH OR THE LIKE
Filed July 20, 1938  4 Sheets-Sheet 4
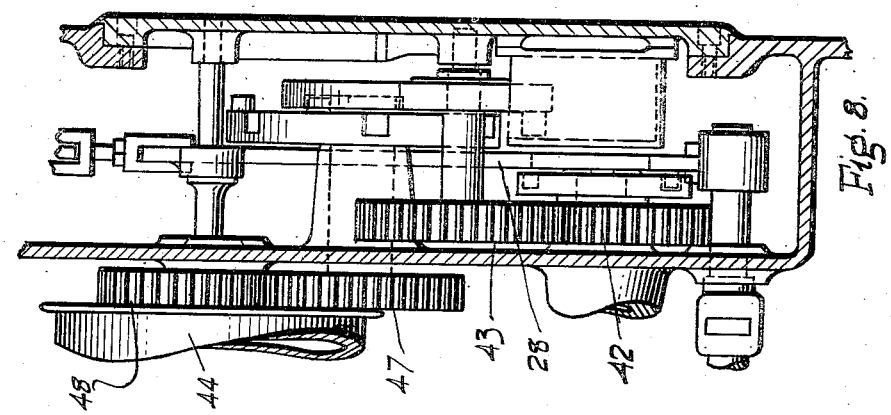
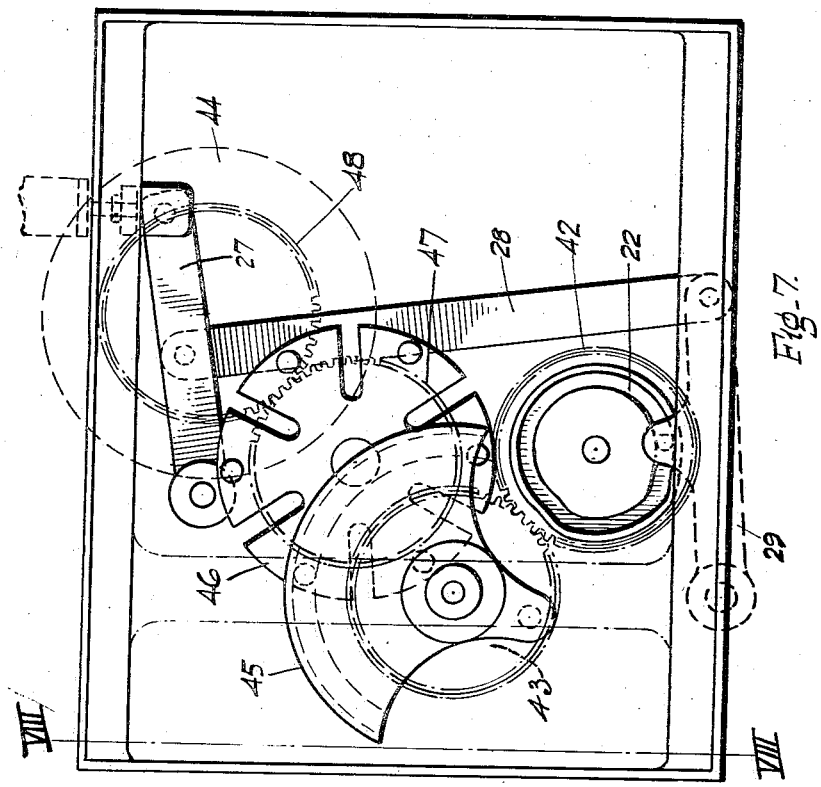
Ejnar Christiansen
Inventor
By
CA Snow & Co.
Attorneys.

Patented Aug. 29, 1939

2,170,988

UNITED STATES PATENT OFFICE 2,170,988

MACHINE FOR FEEDING OR DEPOSITING MEASURED QUANTITIES OF DOUGH OR THE LIKE

Ejnar Christiansen, Birmingham, England

Application July 20, 1938, Serial No. 220,388
In Great Britain July 22, 1937

6 Claims. (Cl. 107—15)

This invention comprises certain improvements in or relating to machines for feeding or depositing measured quantities of dough or the like, and particularly relates to a feeding or depositing device for use with a dough balling machine.

The invention has for its object means for supplying measured quantities of dough or other material at intermittent intervals in an efficient manner. A further object is to eject the dough from a measuring chamber which is intermittently rotated.

A convenient embodiment of this invention is illustrated by way of example in the accompanying drawings, on which—

Figure 1 is a side elevation of a dough balling or moulding machine.

Figure 2 is a cross-sectional elevation of one end portion of the depositor drum having the measured chambers therein and a portion of the ejecting apparatus.

Figure 3 is an end view of the portion of the ejecting apparatus shown by Figure 2, the parts being shown in the position at the end of the ejecting stroke.

Figure 4 is a similar view to Figure 3, but showing the parts in position with the piston set in the measuring chamber for receiving the dough.

Figure 5 is a front view of the mechanism for intermittently driving the deposit drum and for operating the ejector, the support for the outer ends of the shafts of the mechanism being removed.

Figure 6 is a section on line VI—VI of Figure 5.

Figure 7 is a front view of the mechanism for driving the conveyor on which the ejected pieces of dough are received, the support for the outer ends of the shafts being removed, and Figure 8 is a section on line VIII—VIII of Figure 7.

According to the present invention, the dough is fed into a piston chamber 1 in a member or deposit drum 2 mounted to rotate at right angles to the axis of the piston chamber, and means are provided for ejecting a measured quantity of dough by means of a member 3 which is slidably mounted in the rotary member 2 and which is connected to the piston 4 in the said piston chamber. Means are provided for adjustably positioning the piston 4 so that the measured quantity of dough fed into the piston chamber can be regulated. A plurality of pistons 4 and piston chambers 1 may be mounted in a rotary member and the pistons are simultaneously actuated as a single unit. Projections 5 on a member 6 located at each end of a rod 3 connecting the pistons, co-act with the curved member or cam device 7 which forms an abutment limiting the movement of the connecting rod 3 against the feeding pressure and consequently the capacity of the piston chamber into which the dough is forced. After the pistons 4 have been moved down to eject the dough, the lower projection 5 on the member 6, at the commencement of the next quarter turn of the rotating drum or member, strikes the curve track 8 or cam and as the projection rides over the curved surface the rod 3 connecting the pistons is moved inwardly to set the pistons to form the end of the chambers receiving the dough. The projection 5 is maintained in contact with the track 8 by means of the spring pressed arm 9 which bears against the other projection 5. The arm 9 is pressed inwardly by the spring 10 to a limited extent controlled by the slot 11 in the arm engaging a pin. The arm is curved so that the pin 5 can engage the same and on the continued movement press the arm back. In order to adjust the inward movement of the pistons, the cam member is pivoted at 12 at its lower end on a stationary member and the upper end has teeth 13 thereon which engage with a toothed wheel 14 on the cross shaft 15, a wheel being mounted on each side of the cross shaft so that the cam members on each side of the machine are simultaneously controlled. The cross shaft may be operated by means of a worm and worm wheel 16 operated by a hand control wheel or hand grip, and a pointer thereon or indicator associated therewith is adapted to show on a scale the quantity of dough which is fed into the piston chambers. The feed or deposit drum comprises a cylindrical member which is arranged with its axis horizontal and above an intermittently moved conveyor belt on to which measured portions of dough or the like are ejected. This cylindrical drum has portions 17 of reduced diameter at each end which are journalled in the machine frame 18, and the drum is adapted to be intermittently rotated, through 90 degrees at each step, by means of a Geneva or other intermittent gear and a suitable train of toothed gears, and the measured portions of dough are automatically ejected when the measuring chambers in the drum are in a vertical position. The drum has, in this embodiment, four cylindrical measuring chambers 1 passing diametrically therethrough, such chambers being equally spaced apart. A cylindrical piston 4 is slidably mounted in each chamber, and the length of the piston is less than the diameter of the drum so that when the piston is at either end of the stroke and in a horizontal position, a space is provided in the piston or measuring chamber at one end of the piston to receive a quantity of dough or the like from a feed device 19 of any suitable type. The four pistons 4 are connected together to move in unison by means of a rod 3 which passes diametrically through each piston at the middle thereof, and the rod is guided in elongated slots 20 in the side walls of each measuring chamber and in the end walls of the drum, so that the rod is always parallel to the axis of the drum and is constrained to move only at right angles to the axis of the drum in one plane. The effective stroke of the pistons is adjustable to vary the capacity of the chambers receiving the quantity of dough fed into the drum. For this purpose, the rod 3 connecting the pistons has a member 6 fixed to each end, and the inner face of each disc has a pair of diametrically opposite inwardly directed cylindrical projections 5 which form abutments for coacting with the curved track 8 on the face of the cam member 7 which at one end is pivotally mounted at 12 on a stationary plate or member arranged at the end of the drum, whilst the top of such cam member coacts with an adjustment device for varying the distance between the axis of the said rod 3 and the axis of the drum. The pistons are moved into the ejecting position by means of sliding plates 21 which respectively engage each end of the rod 3 passing through the pistons, such sliding plates being coupled to links which are operated by continuously rotating ejector cams 22. Each sliding plate has an opening therein 23 near the upper end which is shaped and arranged to permit the ejector rod to move in a circular path around the axis of the drum, when the drum is rotated, and a flat horizontal portion 24 at the top of the opening coacts with flats on the ejector rod 3 during the movement of the same to move the pistons into the ejecting position. Each sliding ejector plate has a knuckle joint member 25 pivotally connected to its lower end, and each of such members is adjustably coupled to a pivoted knuckle piece 26 on the end of an upper rocking lever 27. Each rocking lever is pivotally connected at its outer end to the machine frame. A connecting link 28 is pivotally connected to each of the rocking levers intermediate their ends, each link is pivotally connected to a second or lower pivotal rocking lever 29 which is operated by one of the aforesaid continuously rotating cams 22. The latter rocking lever carries a roller which rides in the cam groove 30, and therefore when the projecting part 31 of the cam track strikes the roller, the rocking levers are pivoted, and therefore the sliding ejector plates are pulled downwardly to cause a corresponding movement of the ejector rod and pistons. The ejector mechanism is arranged to operate after each half-revolution of the feed drum, when the measuring chambers in the drum are in a vertical position. The drum is driven intermittently, through 90° at each stop from a continuously rotating motor and toothed gearing and a Geneva gear. This Geneva mechanism is housed in an enclosed chamber at the side of the machine frame, a spider arm 54 (Figure 6) shown removed in Figure 1 forms a bearing support for the outer ends of the shafts carrying the various gears. A driven horizontal shaft 33 has a disc member 34 keyed or otherwise fixed thereto, and this member has a recess in the periphery which extends for substantially one quarter of the circumference of the disc. The outer face of the disc member has a radially arranged oval shaped projection or crank arm thereon the major axis of which lies centrally between the ends of said circumferential recess. The inner face at the outer end of this crank arm has a pin or roller thereon, the axis of which is parallel to the driven shaft. This crank pin or roller is adapted to engage, in turn, each of four radially arranged slots in a star wheel 35 to cause the star wheel to be rotated one quarter of a revolution for each complete revolution of the crank arm. The star wheel is shaped between the slotted arms to receive the circumferential portion of the said disc member, and the arrangement is such that said circumferential portion moves into engagement with an inwardly curved wall or edge of the star wheel just as the crank pin or roller is leaving one of the slots in the star wheel, and therefore the star wheel will be rotated one quarter of a revolution for a similar movement of the crank arm and disc and will be held stationary whilst the crank shaft makes the remaining three quarters of the revolution. The slotted star wheel spindle has a toothed gear wheel 36 fixed thereto which meshes with an idler wheel itself meshes with a toothed wheel 37 fixed on the aforesaid reduced end of the depositing drum, and therefore such drum will be intermittently rotated through 90° and held against rotation after each partial rotation. The ejector mechanism operates after each second partial rotation of the drum, i. e., after the same has moved through 180°. When the drum is in position to receive the dough from the hopper, the measuring chambers are horizontal, and when the measuring chambers are filled, the drum is rotated in a clockwise direction through 90°, and the ejector cams operate the link mechanism and sliding plates for moving the pistons vertically to eject the measured quantities of dough on to the conveyor belt 38, which belt is then moved forward a suitable amount. The drum is then rotated a further 90° to bring the measuring chambers into line with the feed plunger 19, and when they are filled, the drum is again rotated in a clockwise direction through 90°, and the ejector mechanism is again automatically operated.

The hole in the ejector may have a flat 39 on the bottom so that the cross rod will be lifted to assist the commencement of the lifting action of the cam member, this lifting action being advantageous when the cam member is set inwards presenting a steep incline against which the projections strike. The cam 22 has a second projection 40, so that after the rod 3 has been initially raised by the flat 39, the ejector will be lowered to permit of free movement of the rod 3 when moving from the position shown by Figure 3 to the position shown by Figure 4.

At the opposite side of the machine a spur wheel 42 is fixed to the ejector-cam shaft, and such wheel is arranged to mesh with a spur gear 43 on a spindle carrying the driving part of an indexing mechanism for intermittently rotating and holding the conveyor belt drum 44. This spindle is journalled at one end in the inner side wall of the gear box housing or chamber on the machine frame, and the opposite end of the spindle is journalled in a spider arm for the outer side of the gear box or housing. The indexing mechanism comprises two rotary members 45 and 46 which interengage to produce a partial rotation of a driven member for a complete rotation of the driving member, the driven member being positively held stationary between its partial rotary movement. The driving member 45 has a substantially semi-circular segment and a radial outwardly projecting arm arranged centrally between the ends of the circumference portion of the segment. An arcuate groove is formed in the back face of the segmental portion of the member, the groove being concentric with the driving spindle. A cylindrical pin or roller is fixed to the end of the said radial arm to project from the back face thereof. This pin or roller is adapted to engage, in turn, each of six radially arranged open ended slots in the periphery of the driven member 46 of the indexing mechanism to cause such member to be rotated one sixth of a revolution for each complete revolution of the driving segment. The driven member has six outwardly projecting pegs or rollers on the front face, each peg or roller being arranged centrally between two adjacent slots. With this arrangement, as the pin or roller on the segment arm moves out of engagement with a slot in the driven member, one of the pegs or rollers on the driven member enters the arcuate slot in the segment, and therefore the driven member is held against rotation whilst at the same time the segment can continue its rotation. The driving member may dip into an oil bath carried by the gear box cover plate so that the projecting pegs and the arcuate groove are automatically lubricated as the members rotate. The spindle carrying the driven member of the indexing mechanism has a spur wheel 47 fixed thereon which meshes with the spur gear 48 on the conveyor belt drum, and therefore the drum is partially rotated at intervals and is held stationary between successive movements. The driven belt drum comprises a hollow cylindrical member which is closed at the ends by means of a cap member each having a flanged wall fitting inside the ends of the drum and a flanged rim which projects above the cylindrical surface of the drum to keep the belt in position. The toothed member for driving the drum 44 comprises an externally toothed ring which is bolted to the side of one end cap on the drum. The drum spindle is mounted at its outer ends in ball bearings carried by the respective side walls of the gear boxes on opposite sides of the machine. A similar or suitable rotary drum is mounted at the forward end of the machine.

The plunger 19 is reciprocated by the lever 50 driven from the crank 51 on a shaft driven by the gear wheel 52 on the shaft carrying the cams 22. The drive for the various parts is taken from the motor 53.

I claim—

1. Means for supplying a measured quantity of dough or like material, comprising a deposit drum having a piston chamber diametrically therethrough, a piston in the piston chamber having a lateral projection, means for intermittently rotating the deposit drum so that it successively passes into "feed-in" and "deposit" positions and so that the material is alternately fed into opposite ends of the piston chamber, means for moving the piston into position in the piston chamber for the next feed-in position of the deposit drum after an ejection, and means for ejecting the material from the piston chamber coacting with the said lateral projections and adapted to slide outwardly the piston at each deposit position.

2. Means for supplying a measured quantity of dough or like material, comprising a deposit drum having a piston chamber diametrically therethrough, a piston in the piston chamber having a lateral projection, means for intermittently rotating the deposit drum so that it successively passes into "feed-in" and "deposit" positions and so that the material is alternately fed into opposite ends of the piston chamber, means for moving the piston into position in the piston chamber for the next feed-in position comprising a cam track against which an abutment, on the said lateral projection on the piston, co-acts as the deposit drum is rotated from the "deposit" position to the "feed-in" position and means for ejecting the material from the piston chamber co-acting with the said lateral projections and adapted to slide the piston outwardly at each deposit position.

3. Means for supplying a measured quantity of dough or like material comprising a deposit drum having a piston chamber diametrically therethrough, a piston in the piston chamber having a lateral projection, means for intermittently rotating the deposit drum so that it successively passes into "feed-in" and "deposit" positions and so that the material is alternately fed into opposite ends of the piston chamber, means for moving the piston into position in the piston chamber for the next "feed-in" position comprising a cam track against which an abutment on the said lateral projection on the piston, co-acts as the deposit drum is rotated from the deposit position to the feed-in position, a spring pressed arm for holding the abutment in contact with the said cam track and means for ejecting the material from the piston chamber co-acting with the said lateral projection and adapted to slide the piston outwardly at each deposit position.

4. Means for supplying a measured quantity of dough or like material, comprising a deposit drum having a piston chamber diametrically therethrough, a piston in the piston chamber having a lateral projection, means for intermittently rotating the deposit drum so that it successively passes into "feed-in" and "deposit" positions and so that the material is alternately fed into opposite ends of the piston chamber, means for moving the piston into position in the piston chamber for the next feed-in position comprising a cam track against which an abutment on the said lateral projection on the piston co-acts as the deposit drum is rotated from the deposit to the feed-in position, a movable member on which the cam-track is formed and means for adjusting the movable member to adjust the quantity of material which can be fed into the piston chamber and means for ejecting the material from the piston chamber co-acting with the said lateral projections and adapted to slide the piston outwardly at each deposit position.

5. Means for supplying a measured quantity of dough or like material, comprising a deposit drum having a piston chamber diametrically therethrough, a piston in the piston chamber having a lateral projection, means for intermittently rotating the deposit drum so that it successively passes into feed-in and deposit positions and so that the material is alternately fed into opposite ends of the piston chambers, means for moving the piston into position in the piston chamber for the next feed-in position of the deposit drum after an ejection, and means for ejecting the material from the piston chamber coacting with the said lateral projection and adapted to slide the piston at each deposit position comprising a sliding plate having an opening therein which engages over the lateral projection, and means for reciprocating the sliding plate comprising a cam and linkwork.

6. Means for supplying a measured quantity of dough comprising a drum having a number of piston chambers diametrically therethrough, a piston in each of the piston chambers and connected at their centres by a rod which is slidably mounted in slots in the drum and which project on each side of the drum, a Geneva mechanism for intermittently rotating the deposit drum through an angle of 90° so that the piston chambers are successively moved into a horizontal and vertical position, a feed device at one side of the drum for feeding material into each piston chamber each time a mouth of the chambers is presented thereto when the piston chambers are in a horizontal position, means for moving the pistons in the piston chambers to make the chambers of the required capacity for the "feed-in" and means acting on each end of the said rod for moving the pistons downwards to eject the dough each time the piston chambers are moved into a vertical position.

EJNAR CHRISTIANSEN.